(12) United States Patent
Ohashi

(10) Patent No.: US 6,467,059 B1
(45) Date of Patent: Oct. 15, 2002

(54) WIRELESS TRANSMISSION SYSTEM

(75) Inventor: Tsuyoshi Ohashi, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/385,032

(22) Filed: Aug. 30, 1999

(30) Foreign Application Priority Data

Aug. 31, 1998 (JP) .......................................... 10-245807

(51) Int. Cl.⁷ ............................. H04L 1/18; G01R 31/28
(52) U.S. Cl. ....................................... 714/749; 714/712
(58) Field of Search ................................ 714/748, 749, 714/712; 370/235

(56) References Cited

U.S. PATENT DOCUMENTS

| | | | | |
|---|---|---|---|---|
| 5,274,837 A | * | 12/1993 | Childress et al. | 455/7 |
| 5,367,523 A | * | 11/1994 | Chang et al. | 370/235 |
| 5,479,441 A | * | 12/1995 | Tymes et al. | 375/130 |
| 5,528,621 A | * | 6/1996 | Heiman et al. | 375/133 |
| 5,668,803 A | * | 9/1997 | Tymes et al. | 370/312 |
| 5,754,799 A | * | 5/1998 | Hiles | 710/110 |
| 5,771,235 A | * | 6/1998 | Tang et al. | 370/446 |
| 5,852,723 A | * | 12/1998 | Kalkunte et al. | 709/235 |
| 5,905,870 A | * | 5/1999 | Mangin et al. | 709/234 |
| 6,055,578 A | * | 4/2000 | Williams et al. | 709/253 |
| 6,078,591 A | * | 6/2000 | Kalkunte et al. | 370/448 |
| 6,105,064 A | * | 8/2000 | Davis et al. | 709/224 |
| 6,307,867 B1 | * | 10/2001 | Roobol et al. | 370/470 |
| 6,327,254 B1 | * | 12/2001 | Chuah | 370/328 |

OTHER PUBLICATIONS

Leung, V.C.M.; Packet reservation protocols for multichannel satellite networks; Communications, Speech and Vision, IEE Proceedings I, vol.: 140 Issue: 6, Dec. 1993 pp.: 453–461.*

* cited by examiner

Primary Examiner—Albert Decady
Assistant Examiner—Joseph D. Torres
(74) Attorney, Agent, or Firm—Oliff & Berridge, PLC

(57) ABSTRACT

When a parent device of a wireless transmission system receives a transmission request, then in S1, the parent device generates a data packet to be transmitted to the child device. In S2, the parent device confirms whether or not the parent device is presently receiving data. In S3, the parent device transmits the data packet to the child device. When the parent device receives no response packet (S4:NO), then after waiting for a retry waiting time to elapse (S5), the parent device retransmits the data packet in S6. A retry waiting time of the parent device is set longer than a retry waiting time of the child device by an amount equivalent to the time width of the data packet itself and twice a delay time generated during wireless transmission. Therefore, the child device retransmits its data packet with priority over the parent device. With this configuration, data can be stably transmitted and received even after data collides.

18 Claims, 8 Drawing Sheets

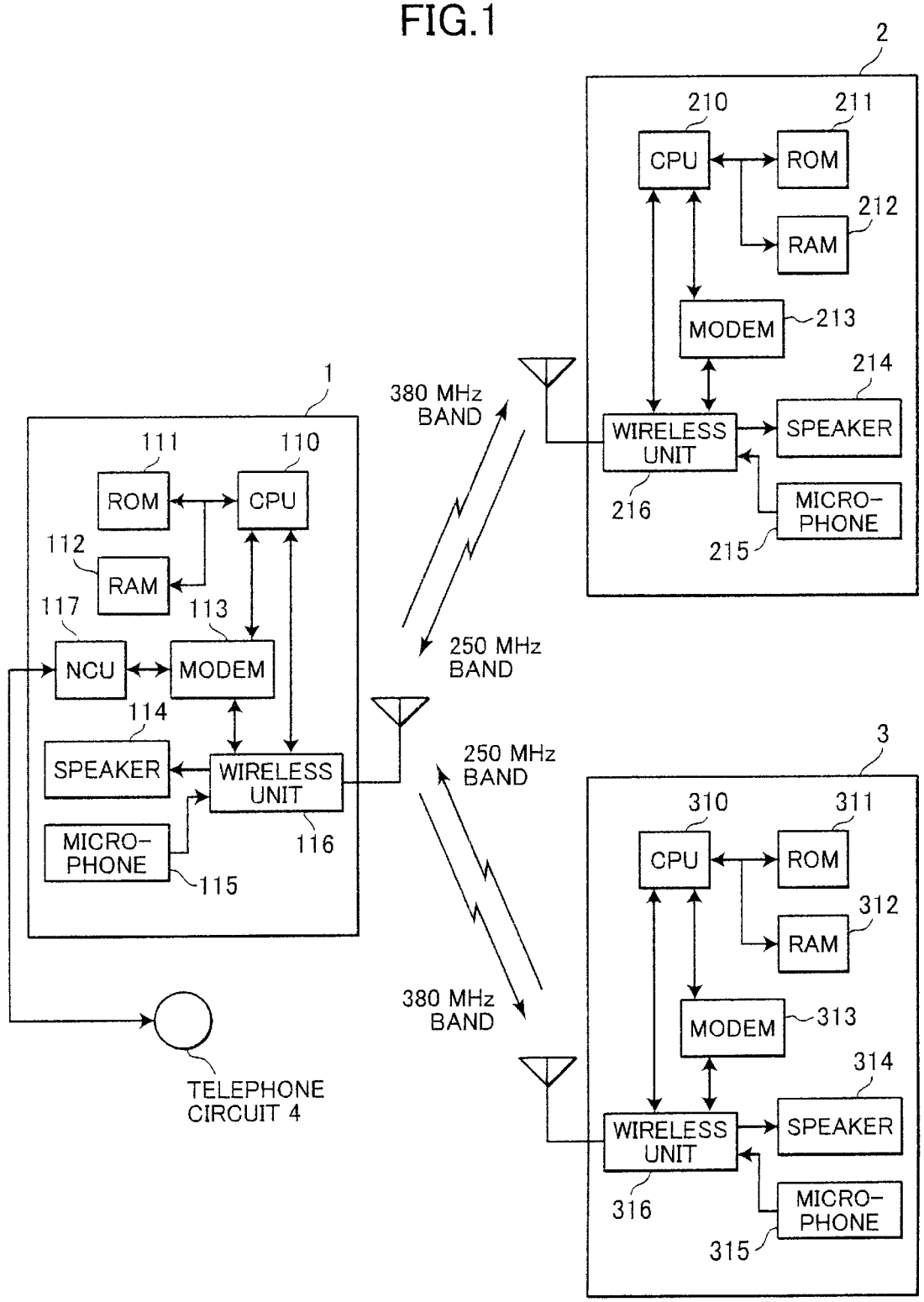

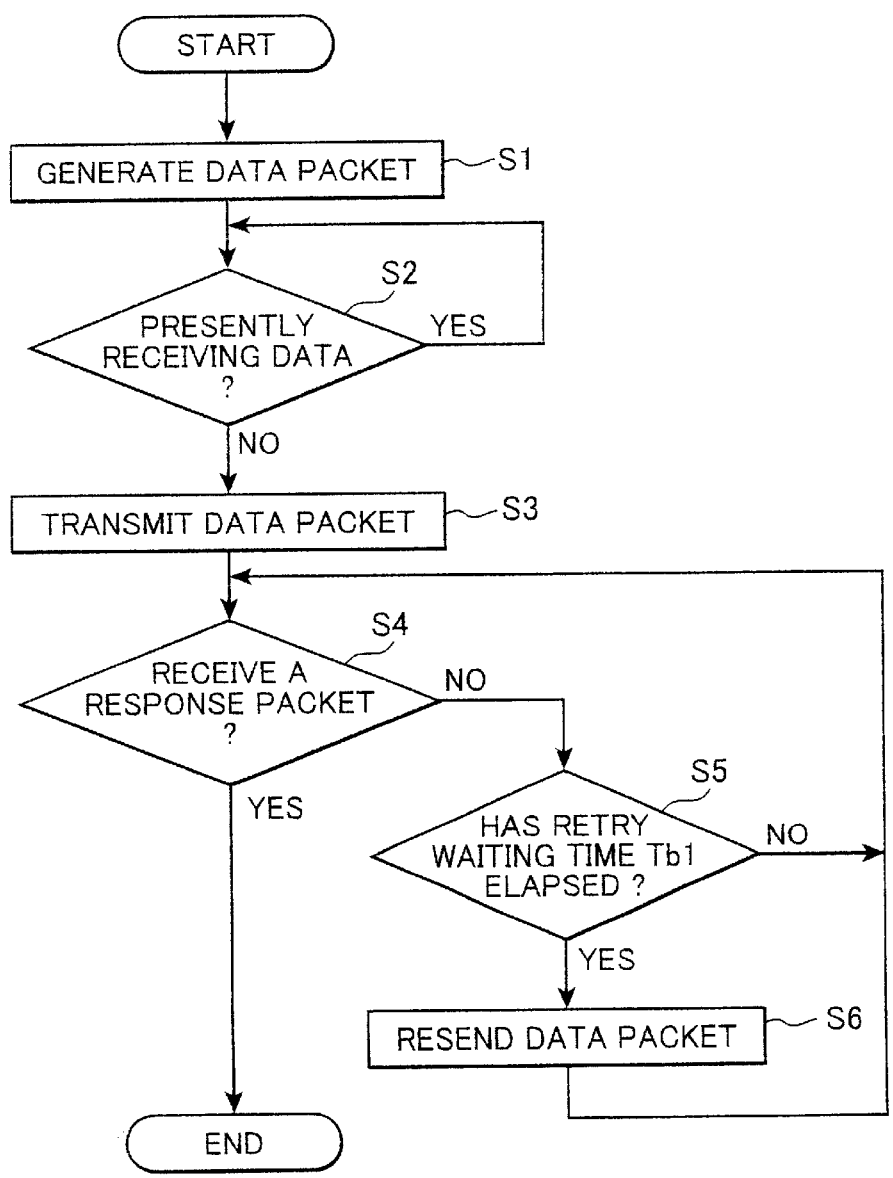

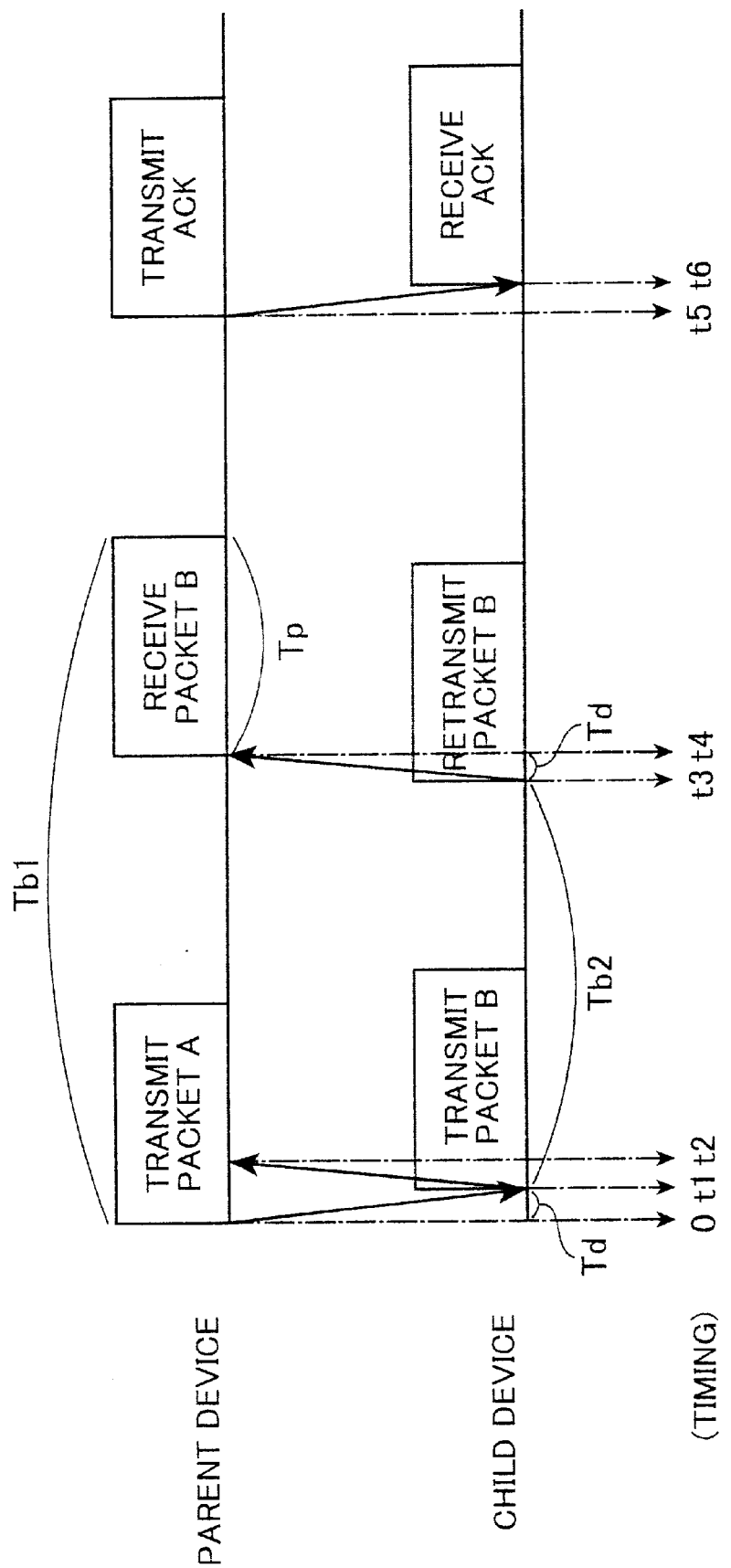

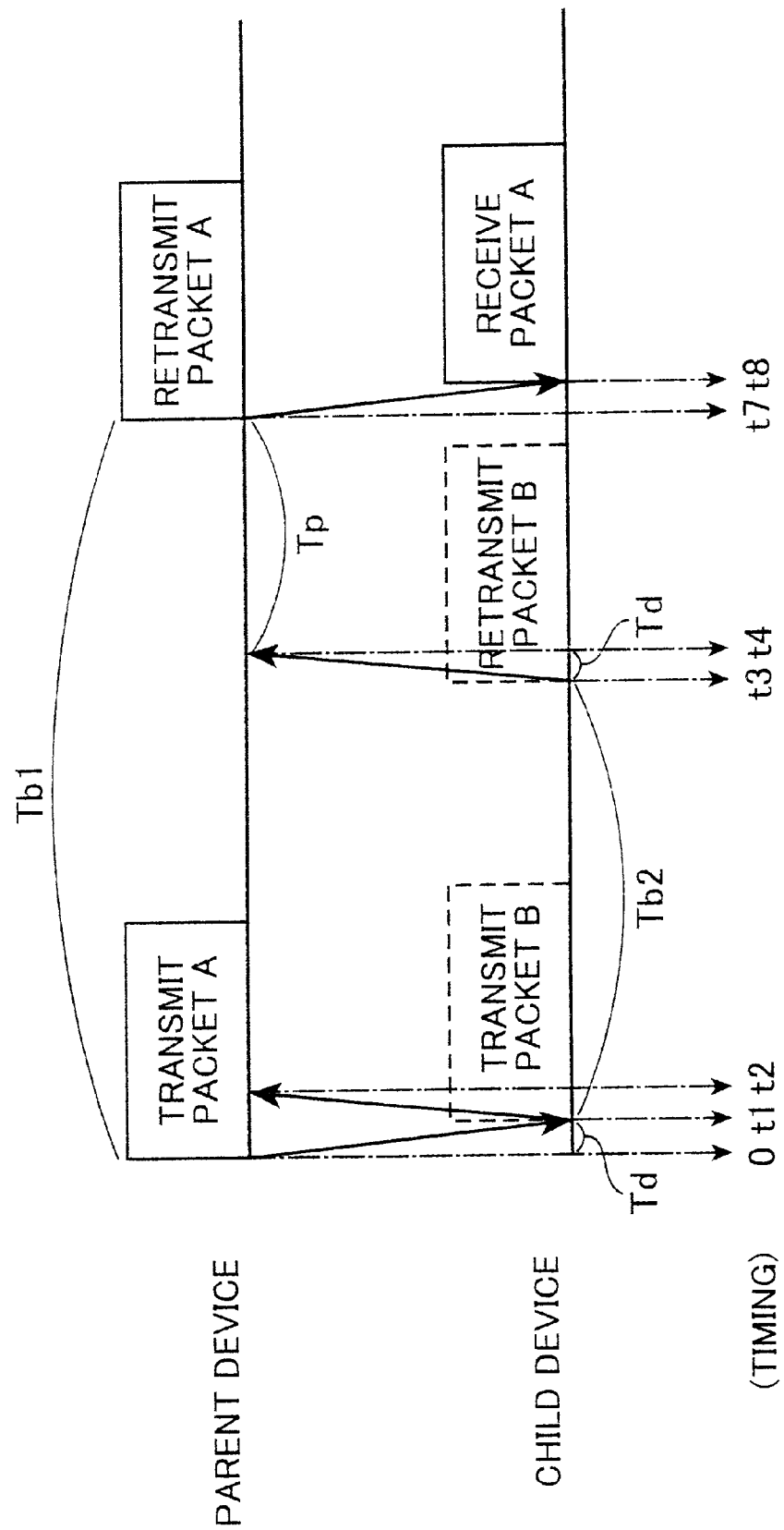

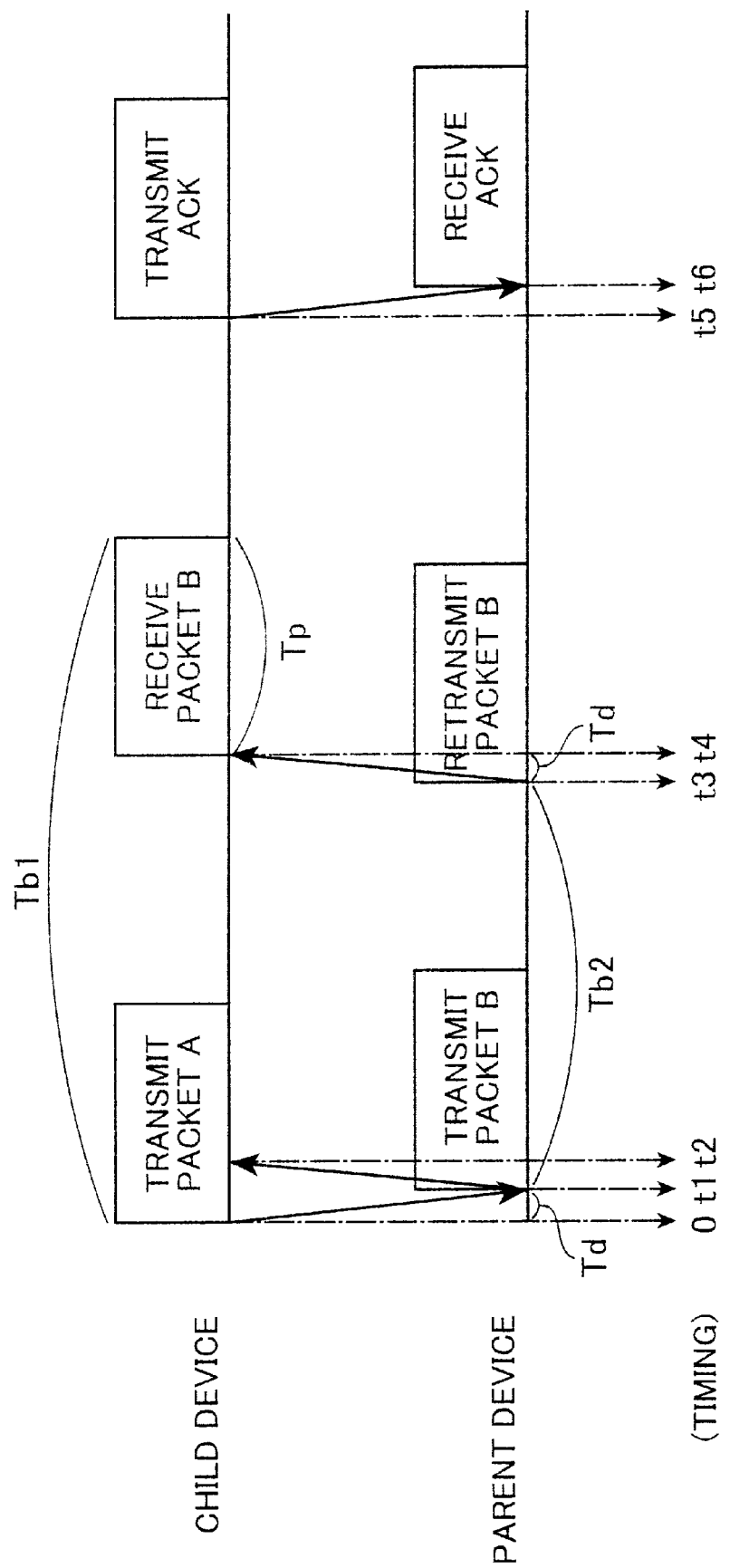

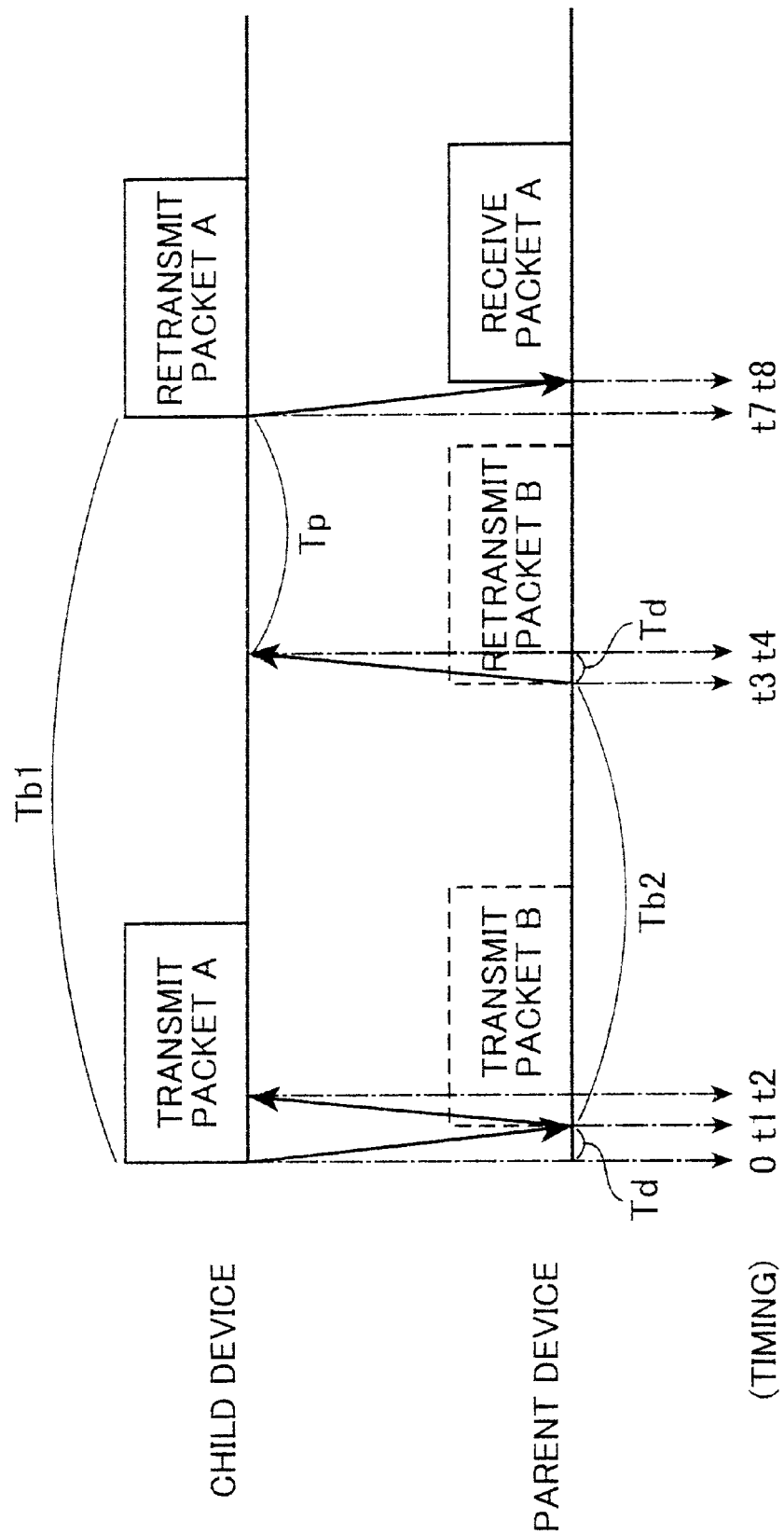

WIRELESS TRANSMISSION SYSTEM

BACKGROUND OF THE INVENTION

1. Field of the Invention

The present invention relates to a wireless transmission system, such as an analog cordless telephone system, wherein a parent device and one or more child devices communicate a variety of different data types using wireless transmission.

2. Description of the Related Art

Analog cordless telephone systems, including a parent device and at least one child device, have recently become popular. Audio signals are transmitted between the parent device and the child devices over a free channel selected from a plurality of channels. The audio signals are frequency modulated (FM) and transmitted using a full duplex transmission scheme.

The parent and child devices will need to transmit and receive data other than the audio data of the telephone call, before, during, and after a telephone call actually takes place. For example, when the user attempts to make a telephone call using a child device, the child device must transmit the dialing information to the parent device. Also, the parent device will sometimes need to transmit information to the child device about whether the telephone line is connected. In cases like this, the selected channel is used to communicate data packets using minimum shift keying (MSK).

Data packets are normally transmitted and received in half duplex mode, for example because of limitations in processing ability of the CPU. Here, an explanation will be provided for half duplex operations performed when a parent device needs to transmit a data packet to a child device. First, the parent device confirms that it is not itself receiving a data packet. After confirming this, the parent device transmits its own data packet to the child device. When the child device receives the data packet from the parent device, it sends a response packet to the parent device in return. If the parent device does not receive such a response packet from the child device, even after a fixed retry waiting time elapses from when the parent device initially transmits the data packet, then the parent device retransmits the data packet. In this way, transmission and reception of data can be reliably performed.

However, in an analog cordless telephone system, there is no way for the parent and child devices to predict when the other device will transmit a data packet. Therefore, there will be times when both the parent and child devices attempt to transmit data packets at the same time. In this case, the data packets transmitted from the parent and child devices will collide with each other.

Because data packets that collide can not be properly received, neither device will transmit a response packet. When no response packet is received, both devices will attempt to retransmit their data packets. If both the parent and child devices are set with the same retry waiting time, then the resent data packets will again collide with each other. To avoid this problem, the parent and child device can be designed to randomly change the retry waiting time.

SUMMARY OF THE INVENTION

However, if the retry waiting time is random, then it will be impossible to predict which of the parent or the child device will first receive the resent data packets after a collision. Also, time required to retransmit the data packets fluctuates. Further, the possibility remains that the data packets will again collide with each other. As a result, data transmission and reception is unstable.

It is an objective of the present invention to provide a wireless transmission system and a wireless transmission method for communicating data between parent and child devices in half duplex mode, wherein communication of data is easily controlled, and data packets are properly resent after data packets collide.

To achieve the above-described objectives, a wireless transmission system according to the present invention includes a parent device and at least one child device configured in the following manner. The parent device and the at least one child device establish a wireless connection to exchange data packets using half duplex transmission. The parent device and the at least one child device resend a data packet for which no response packet was received. One of the parent device and the at least one child device wait a retry waiting time $Tb1$ from transmission of the data packet before resending a data packet, and the other of the parent device and the at least one child device wait a retry waiting time $Tb2$ from transition of the data packet before resending a data packet. The retry waiting time $Tb1$ is set to satisfy the following relationship with the retry waiting time $Tb2$, a propagation delay $Td$ from when a data packet is sent until the data packet is supposed to reach its intended destination, and a time width $Tp$ of the data packet:

$$Tb1 \geq Tb2 + 2Td + Tp.$$

That is, both the parent device and the child device retransmit data packets when they do not receive a response packet for a transmitted data packet after a retry waiting time elapses from when the original data packet was transmitted. However, the parent and the child devices use different retry waiting times $Tb1$ and $Tb2$ to determine if and when to retransmit a data packet. One retry waiting time $Tb1$ is greater than or equal to the other retry waiting time $Tb2$, plus two times a propagation delay $Td$ from when the data packet is sent until the data packet is received, plus a time width $Tp$ of the data packet, that is, $Tb1 \geq Tb2 + 2Td + Tp$. With this configuration, even if data packets transmitted from the parent and the child device collide with each other, one of the data packets will be reliably transmitted before the other, so that stable reception and transmission of data can be performed.

The parent device can be set to use the retry waiting time $Tb1$ and the at least one child device can be set to use the retry waiting time $Tb2$. In this case, because the parent device is set with the retry waiting time $Tb1$, which is equal to or greater than the sum of $Tb2+2Td+Tp$, when the transmission of data packets from the parent and child devices collide with each other, the data packet from the child device will be retransmitted with priority over the data packet from the parent device. This configuration is particularly suitable for use in a cordless telephone system, wherein the child device frequently transmits data such as dialing information to the parent device.

Alternatively, the parent device can be set to use the retry waiting time $Tb2$ and the at least one child device can be set to use the retry waiting time $Tb1$. Because the child device is set the retry waiting time $Tb1$, which is equal to or greater than the sum of $Tb2+2Td+Tp$, when transmission of data packets from the parent device and the child device collide with each other, the data packet from the parent device will be resent with priority over the data packet from the child device. This configuration is particularly well suited for situations where it is desired to reliably transmit extremely important data from the parent device, such as information that tells the child device whether or not the telephone circuit is connected.

It is desirable that the parent device and the at least one child device be adapted to receive a priority command indicating that one of the parent device and the child device has priority for exchange of data packets. When the priority command indicates the parent device has priority, then the parent device uses the retry waiting time Tb2 and the at least one child device uses the retry waiting time Tb1. On the other hand, when the priority command indicates the at least one child device has priority, then the parent device uses the retry waiting time Tb1 and the at least one child device uses the retry waiting time Tb2.

With this configuration, a priority command can be transmitted between the parent device and the child device, to designate which of the parent and child devices is to be given priority. The device designated as having priority is set with the retry waiting time Tb2, and the device not designated as having priority is set with the retry waiting time Tb1, wherein Tb1≧Tb2+2Td+Tp as mentioned above. Accordingly, reception and transmission of data is stable and also flexible. When transmission of data packets from the parent and child devices collide, the data packet that needs to be resent first can be transmitted with priority as best suited for the present circumstances.

It is desirable that the wireless transmission system is a cordless telephone system connected to a telephone line. When the present invention is applied to a cordless transmission system, the retry waiting times for communication of data between the parent and the child devices are controlled as described above. Accordingly, when necessary information, such as dialing information and line connection information, is transmitted over a transmission channel using a half duplex transmission scheme, reception and transmission of data can be stably performed using a simple control configuration that does not increase costs.

BRIEF DESCRIPTION OF THE DRAWINGS

The above and other objects, features and advantages of the invention will become more apparent from reading the following description of the embodiment taken in connection with the accompanying drawings in which:

FIG. 1 is a block diagram showing electrical configuration of a wireless transmission system according to the embodiment of the present invention;

FIG. 2 is a schematic view showing data areas in a data packet transmitted in the system of FIG. 1;

FIG. 3 (B) is a flowchart showing processes performed in a child device of the system, relating to transmitting and retransmitting a data packet;

FIG. 4 is a timing chart showing timing of retransmission of a data packet from the child device and reception of the retransmitted data packet by the parent device, when the parent device is set with the retry waiting time Tb1 and the child device is set with the retry waiting time Tb2;

FIG. 5 is a timing chart showing timing of retransmission of a data packet from the parent device and reception of the retransmitted data packet by the child device, when the retry waiting times Tb1, Tb2 are set as in FIG. 4;

FIG. 6 is a timing chart showing timing of retransmission of a data packet from the parent device and reception of the retransmitted data packet by the child device, when the child device is set with the retry waiting time Tb1 and the parent device is set with the retry waiting time Tb2;

FIG. 7 is a timing chart showing timing of retransmission of a data packet from the child device and reception of the retransmitted data packet by the parent device, when the retry waiting times Tb1, Tb2 are set as in FIG. 6;

DETAILED DESCRIPTION OF THE EMBODIMENT

Figure 3B:
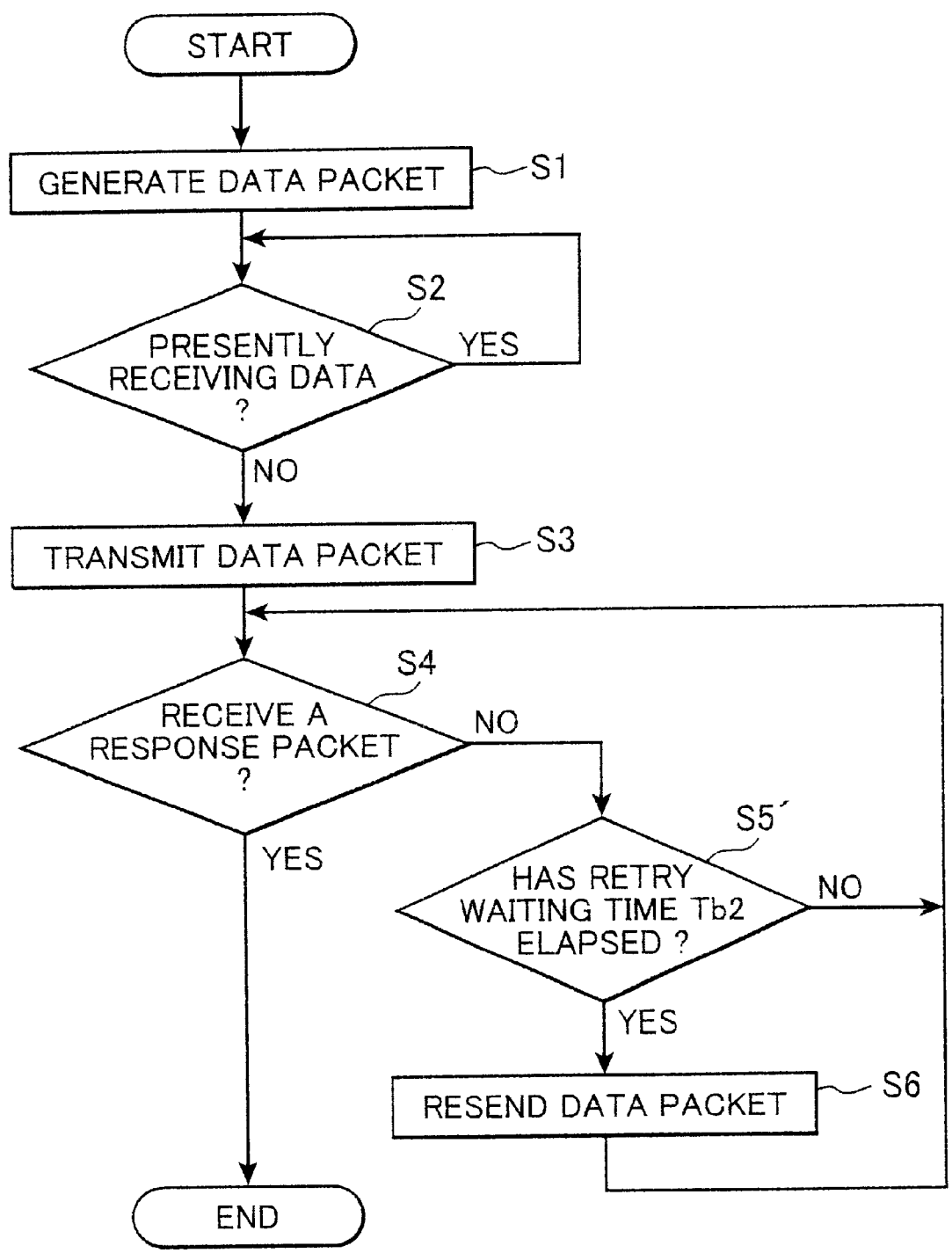
FIG. 3 (A) is a flowchart showing processes performed by a parent device of the system, relating to transmitting and retransmitting a data packet.

A wireless transmission system according to the embodiment of the present invention will be described while referring to the accompanying drawings. In the embodiment, the present invention is applied to an analog cordless telephone system. The analog cordless telephone system includes a parent device 1 and a plurality of child devices 2, 3, which communicate over 250 MHz and 380 MHz frequency bands. Data is transmitted and received in half duplex mode, and audio signals are transmitted and received in full duplex mode.

FIG. 1 is a block diagram showing system configuration of the cordless telephone system according to the present embodiment. As shown in FIG. 1, the cordless telephone system of the present embodiment includes a parent device 1 and two child devices 2, 3. The parent device 1 is connected to a telephone line 4. The child devices 2, 3 are connected to the parent device 1 using wireless transmission. More than two child devices can be provided, but only two will be described in the present embodiment to facilitate explanation.

Here, a brief explanation will be provided for electrical configuration of the parent device 1. The control system of the parent device 1 includes a CPU 110, a ROM 111, and a RAM 112, all connected to each other by a bus line. The CPU 110 is connected to a wireless unit 116 and to a modem 113. The modem 113 is connected to the wireless unit 116 and to a network control unit (NCU) 117. The NCU 117 is connected to the telephone line 4. The wireless unit 116 is connected to a speaker 114 and a microphone 115 of handset, for example. As shown in FIG. 1, the child devices 2, 3 have electrical configuration substantially the same as the parent device 1, so their detailed explanation will be omitted. To facilitate understanding, like components in the parent device 1 and the child devices 2, 3 are indicated in FIG. 1 by numbering with the same last two digits.

Transmission from the parent device 1 to the child devices 2, 3 is performed over the 380 MHz frequency band. That is, the 380 MHz frequency band is used for the transmission frequency of the parent device 1 and for the reception frequency of the child devices 2, 3. On the other hand, transmission from the child devices 2, 3 to the parent device 1 is performed over the 250 MHz frequency band. That is, the 250 MHz frequency band is used for the transmission frequency of the child devices 2, 3 and reception frequency of the parent device 1. Each frequency band includes 89 wireless channels for a total of 178 channels.

Most of the wireless channels are allotted as communication channels for transmission and reception of audio signals. However, one portion of the wireless channels is allotted as control channels for transmission and reception of control signals. Wireless communication between the parent device 1 and the child devices 2, 3 is first established using the control channels. Then, transmission and reception of audio signals and commands is performed thereafter over a pair of communication channels that have been confirmed as being unused, that is, over one channel of each of the 250 MHz and 380 MHz frequency bands.

Audio signals are communicated between the parent device 1 and the child devices 2, 3 in full duplex mode over two frequencies. For example, when a user has a telephone conversion using the child device 2, the microphone 215 of the child device 2 is used to convert the user's voice into an audio signal. The wireless unit 216 of the child device 2 transmits the audio signal to the parent device 1 by frequency modulation (FM) of the selected communication channel of the 250 MHz band according to the audio signal. The wireless unit 116 of the parent device 1 receives the audio signal over the channel and demodulates the audio signal. Then the parent device 1 transmits the demodulated signal across the telephone line 4 using the NCU 117. On the other hand, when the parent device 1 receives an audio signal over the telephone line 4 and the NCU 117, the wireless unit 116 of the parent device 1 transmits the audio signal to the child device 2 by frequency modulation (FM) of the selected communication channel of the 380 MHz band according to the audio signal. The wireless unit 216 of the child device 2 receives the audio signal over the communication channel, and demodulates it. Then the child device 2 outputs the demodulated audio signal as sound using the speaker 214.

In contrast to this, information, such as dial information, is transmitted in data packets between the parent device 1 and the child devices 2, 3 in half duplex mode. For example, when the user dials a telephone number using the child device 2 before actual start of a telephone call, the CPU 210 of the child device 2 generates a data packet with information corresponding to the dial keys pressed by the user. The wireless unit 216 of the child device 2 transmits the information to the parent device 1 at an appropriate timing by using MSK modulation to modulate a transmission channel of the 250 MHz band based on the data packet. After the wireless unit 116 of the parent device 1 receives the information over the transmission channel, the CPU 110 of the parent device 1 extracts the required information from the data packet.

On the other hand, when the parent device 1 transmits information, such as for terminating a telephone call being held using the child device 2, the CPU 110 of the parent device 1 generates a data packet including this information, and the wireless unit 116 transmits the data packet using MSK modulation to modulate the transmission channel in the 380 MHz band based on the data packet. After the wireless unit 116 of the child device 2 receives the predetermined transmission channel, the CPU 110 of the child device 2 extracts the required information from the data packet.

The parent device 1 and the child devices 2, 3 exchange data packets over control channels using half duplex transmission. That is, with respect to data packets, the parent device 1 and the child devices 2, 3 perform transmission processes and reception processes at different times. Because the same circuitry for transmitting audio signals is used for exchange of data packets, the data packet signals must be transmitted within the range of 300 Hz to 3 KHz, which is the normal range of audio signals. Therefore, MSK modulation must be performed at a modulation speed of about 1200 to 2400 bps. If data packets were exchanged using full duplex transmission in the same manner as audio signals, the CPUs of the parent device 1 and the child devices 2, 3 would have to perform processes at extremely high speeds. Expensive components are required to enable such high speed processing. Therefore, to lighten the processing burden, and consequently reduce overall costs of the system, the parent device 1 and the child devices 2, 3 exchange data packets using half duplex transmission.

FIG. 2 shows configuration of a typical data packet exchanged between the parent device 1 and the child devices 2, 3. As shown in FIG. 2, each data packet includes ID data, two BCH codes, a child device number, and transmission data. Each of these items is allotted with a required number of bits.

The ID data indicates a particular number assigned to the cordless telephone system and is different for each different cordless telephone system. The parent device 1 and the child devices 2, 3 analyze the ID in each data packet they receive, to determine whether a received data packet was transmitted from the same cordless telephone system. In this way, the ID data enables the parent device 1 and the child devices 2, 3 to accurately recognize data packets from the same system, even if a plurality of cordless telephone systems are operating in the same service area.

The child device number is for distinguishing between different child devices of the cordless telephone system. In data packets transmitted from the parent device 1 to the child device 2, 3, the child device number indicates which child device is to receive the data packet. In data packets transmitted from the child device 2, 3 to the parent device 1, the child number indicates which child device transmitted the data packet. Although the system shown in FIG. 1 includes only two child devices 2, 3, more child device can be connected to the system. Therefore, the child number portion of the data packet must be allotted a number of bits that enables distinction between all child device when the maximum number of child devices are connected to the system.

The transmission data represents the actual information to be transmitted. There are various types of transmission data. For example, there is command data for transmitting predetermined instructions, and status data for indicating a variety of conditions of the system. Examples of transmission data include a call command transmitted from the parent device 1 to the child devices 2, 3, a dial code transmitted from the child devices 2, 3 to the parent device 1, and a priority command to be described later. It should be noted that a code indicating the type of transmission data can also be appended to the lead end of the transmission data.

BCH codes are transmitted in succession after the ID and after the transmission data. Each BCH code is appended to the packet for correcting errors that can occur when retrieving the data packet, such as errors due to noise relating to wireless transmission. Correction is performed for an ID portion separately from the other portions. The more bits allotted for the BCH code, the greater the correction effect. On the other hand, the fewer bits allotted for the BCH code, the faster processes can be performed. According to the present embodiment, each BCH code is allotted with an number of bits appropriate for striking a good balance with the overall bit allocation.

Although the number of bits allotted to each element of the data packet is fairly flexible to meet needs of the respective elements, the total number of bits in the entire data packet is normally set to a fixed value. Because the modulation speed is fixed to either 1200 bps or 2400 bps, the time width Tp of each data packet can be maintained at a fixed value. According to the present embodiment, each data packet includes 96 bits, and is transmitted at 2400 bps, so the fixed time width Tp is 40 ms. Because the time width Tp of data packets is the same for both the parent device 1 and the child devices 2, 3, it is easy to design timing of when data is to be transmitted or received. According to the present embodiment, the time width Tp of the data packet includes time required to actually transmit the data packet and also a margin of time required to start up circuitry and obtain a stable frequency used in wireless transmission. The margin of time is included in the 96 bit value used to determine the value of Tp.

When the data packet of FIG. 2 is transmitted from the parent device 1 to either of the child devices 2, 3, or from either of the child devices 2, 3 to the parent device 1, and the data packet is properly received, then the device that receives the data packet transmits a response packet to the transmitting device. The transmitting device waits for a retry waiting time of either Tb1 or Tb2, starting from when it first transmitted the data packet, to receive the response packet. If the transmitting device receives no response packet before the retry waiting time Tb1 or Tb2 elapses, then the transmitting device assumes that the data packet was not properly received, and so retransmits the data packet.

As will be described in detail later, the retry waiting Tb1 is set based on the retry waiting time Tb2, and is longer than the retry waiting time Tb2. The parent device 1 uses one of the retry waiting times Tb1 and Tb2, and the child devices 2, 3 use the other of the retry waiting times Tb1 and Tb2. The parent device 1 and the child devices 2, 3 use different retry waiting times in order to prevent the parent device 1 and the child devices 2, 3 from competing with each other when transmitting data packets, and to insure that reception and transmission of data is smoothly performed.

Next, while referring to the flowchart of FIG. 3 (A), an explanation will be provided for operations performed by the parent device 1 to transmit and retransmit a data packet. This specific example explains processes performed by the CPU 110 of the parent device 1 to transmit and retransmit a data packet to the child device 2, based on a program stored in the ROM 111 of the parent device 1. In this example, it is assumed that wireless transmission connection has already been established between the parent device 1 and the child device 2, and that wireless communication is being performed over previously selected communication channels.

When the parent device 1 receives a request from the child device 2 for a particular data packet, for example a request for a data packet with information, such as on the present condition of the telephone line, that needs to be notified to the child device 2, then in S1 the parent device 1 generates a data packet including the device number of the child device 2 and transmission data that represents the information requested by the child device 2.

Then in S2, the parent device 1 determines whether or not it, that is, the parent device itself, is presently performing reception. In other words, because data packets are exchanged using half duplex transmission, the parent device 1 will be unable to transmit the requested data packet if it is presently performing reception of data. In this case, the parent device 1 must wait until it finishes reception before transmitting the requested data packet. Consequently, when the parent device 1 determines that it is presently receiving a data packet (S2:YES), then S2 is repeated until reception is completed. On the other hand, when the parent device 1 determines that it is not presently receiving a data packet (S2:NO), then the program proceeds to S3.

In S3, the parent device 1 performs processes to transmit the data packet to the child device 2. Actually, the parent device 1 transmits the data packet, which has the configuration shown in FIG. 2, by performing MSK modulation for the communication channel presently being used, serially based on the bit arrays of the data packet. As mentioned previously, the time required to transmit the data packet, that is, the time width Tp of data packets, is 40 ms according to the present embodiment.

In S4, the parent device 1 determines whether it has received a response packet from the child device 2 for the data packet transmitted in S3. That is, as mentioned previously, when a device properly receives a data packet, then the device transmits a response packet to the transmitting device, to notify the transmitting device that the data packet was safely received. When the parent device 1 confirms proper reception of a response packet (S4:YES), then transmission operations are completed. On the other hand, when the parent device 1 does not confirm reception of a response packet (S4:NO), then the program proceeds to S5.

In S5, the parent device 1 determines whether or not a retry waiting time Tb1 has elapsed since the data packet was first transmitted in S3. When the retry waiting time Tb1 has not yet elapsed (S5:NO), then the program returns to S4. On the other hand, if the retry waiting time Tb1 has elapsed (S5:YES), then the program proceeds to S6.

In S6, the data packet is resent to the child device 2 because the retry waiting time Tb1 has elapsed since the data packet is first transmitted in S2. The transmission process performed in S6 is performed in the same manner as the transmission process in S3. After the data packet is retransmitted in S6, the program returns to S4 to monitor whether a response packet is received from the child device 2 for the retransmitted data packet.

There will be situations when the parent device 1 does not receive a response packet from the child device 2 even after the data packet is repeatedly transmitted. Therefore, it is desirable to set an appropriate number of times to which the number of retransmissions is to be limited. In this case, when no response packet is received from the child device 2 even after the data packet is retransmitted the preset number of times, then processes for transmitting the data packet are canceled.

FIG. 3 (B) shows a flowchart representing processes performed by the child devices 2, 3 to transmit and retransmit a data packet to the parent device 1. As can be seen, the child devices 2, 3 perform substantially the same processes as the parent device 1, except that in S5', the child devices 2, 3 refer to the retry waiting time Tb2 instead of the retry waiting time Tb1 of the parent device 1.

Next, while referring to FIGS. 4 and 5, timing will be explained for retransmission processes performed by the parent device 1 and the child device 2 during exchange of data packets. FIG. 4 is a timing chart representing the situation when the child device 2 has to retransmit a data packet to the parent device 1, and the parent device 1 properly receives the resent data packet. FIG. 5 is a timing chart representing the situation when the parent device 1 has to retransmit a data packet to the child device 2, and the child device 2 properly receives the resent data packet.

In the situation shown in FIG. 4, the child device 2 ultimately has retransmission priority over the parent device 1. That is, when transmission of a data packet A from the parent device 1 to the child device 2, collides with transmission of a data packet B from the child device 2 to the parent device 1, so that neither data packet A nor B is properly received, in the end retransmission of a data packet B from the child device 2 is given priority over retransmission of the data packet A from the parent device 1.

Transmissions from the parent device 1 to the child device 2 can collide when the parent device 1 starts transmitting while the child device 2 is already transmitting, or when both transmit data packets simultaneously. However, the parent device 1 will have to retransmit the data packet A even at the worst conceivable timing, that is, when the child device 2 starts transmitting the data packet B after a delay time Td from when the parent device 1 starts to first transmit the data packet A.

The delay time Td is generated because of the wireless circuitry in the parent device 1 and the time required for radio waves to propagate to the child device 2. In other words, the delay time Td is the sum of the delay until the wireless circuitry of the transmitting device actually transmits a signal, and the time from when the signal is transmitted until the CPU of the receiving device recognizes the signal. According to the present embodiment the parent device 1 and the child device 2 have the same service area and use similar wireless circuitry, so the delay time Td can be considered a fixed value. According to the present embodiment, the delay time Td is 10 ms.

To facilitate explanation, transmission of the data packet A from the parent device 1 to the child device 2 will be considered to start at timing 0 as shown in FIG. 4. In this example, the child device 2 starts transmitting the data packet B at the worst conceivable timing t1, because the timing t1 equals the delay time Td. If the child device 2 starts transmitting the data packet B any later than by a delay time Td, then the child device 2 will properly receive the data packet A from the parent device 1, without starting transmission of its own data packet B. There will be no need for the parent device 1 to retransmit the data packet A. However, when the child device 2 transmits the data packet B at timing t1, subsequent by the delay time Td from start of transmission of the data packet A at timing 0, then the child device 2 will be transmitting the data packet B when the data packet A from the parent device 1 reaches the child device 2. As a result, the child device 2 will be unable to receive the data packet A from the parent device 1. Further, when the child device 2 transmits the data packet B at the timing t1, the data packet B will reach the parent device 1 at timing t2, which equals two times the delay time Td. If the parent device 1 were not itself transmitting at timing t2, then the parent device 1 will properly receive the data packet B at timing t2. However, in the present example, the parent device 1 is transmitting the data packet A itself at timing t2, so the parent device 1 is incapable of receiving the data packet B from the child device 2. As a result, neither the child device 2 nor the parent device 1 is able to receive the data packet transmitted from the other device, because transmissions of data collide with each other.

After the parent device 1 and the child device 2 transmit their data packets A and B, they wait for response packets to confirm that the transmitted packets were properly received for the predetermined retry waiting times Tb1 and Tb2. As mentioned previously, the child device 2 is set with a shorter retry waiting time Tb2 than the retry waiting time Tb1 of the parent device 1. In essence, this gives the child device 2 a higher priority over the parent device 1 for resending a data packet when their data transmissions collides. Therefore, the child device 2 performs retransmission operations before the parent device 1 begins to.

Accordingly, the child device 2 retransmits the data packet B at a timing t3, which is equal to the sum of the timing t1 (Td) and the retry waiting time Tb2. The retry waiting time Tb2 is determined according to how long the receiving device will maximally require to send a response packet, and is based on the sum of twice the delay time Td, the time width Tp, the time required to analyze a received packet, and the time required to start up the wireless unit. Assuming that the 10 ms is required to analyze a packet and 30 ms is required to start up the wireless unit, then according to the embodiment, the retry waiting time Tb2 is equal to 100 ms (i.e., 20 ms+40 ms+10 ms+30 ms).

When the parent device 1 is not receiving another data packet, such as a data packet from the child device 3, then the parent device 1 starts receiving the resent data packet B at a timing t4, which is equal to the sum of the time t3 and the delay time Td, or said differently, which is equal to the sum of the twice the delay time Td plus the retry waiting time Tb2.

As shown in FIG. 4, the retry waiting time Tb1 is set to equal the sum of the retry waiting time Tb2, two times the delay time Td (2×Td), and the time width Tp of a data packet. This relationship can be represented by the formula Tb1=Tb2+2Td+Tp. According to the present embodiment, the retry waiting time Tb1 is equal to 180 ms (i.e., 20 ms+100 ms+40 ms).

It should be noted that the retry waiting time Tb1 can be set to greater than the sum of the retry waiting time Tb2, twice the delay time Td, and the time width Tp. This relationship can be represented by the formula Tb1>Tb2+2Td+Tp.

If the parent device 1 receives the data packet B from the child device 2 before the retry waiting time Tb1 elapses, then the parent device 1 will cancel retransmission of the data packet A. In this way, when the transmission of the data packets from the parent device 1 and child device 2 collide, and there is a need to retransmit the data packets, the child device 2 retransmits its data packet with priority over the parent device 1.

Because the time width Tp of data packets is the same for both the parent device 1 and the child device 2, the child device 2 continues transmitting the data packet B starting from timing t3 until the time width Tp elapses thereafter, whereupon transmission of the data packet B is completed. Consequently, the parent device 1 continues receiving the data packet B starting from the timing t4 until the time width Tp elapses, whereupon reception of the data packet B is completed.

At timing t5, that is, after a predetermined time elapses from when the parent device 1 completes reception of the data packet B, the parent device 1 starts transmission of a packet ACK to the child device 2. The packet ACK corresponds to a response packet for the data packet B. The parent device 1 uses packet ACK to notify the child device 2 that it has received the data packet B. The child device 2 starts receiving the packet ACK from the parent device 1 at a timing t6, which follows the timing t5 by the delay time Td. When the child device 2 receives the packet ACK, the child device 2 determines that the parent device 1 has properly received the transmitted data packet B.

Next, while referring to the timing chart of FIG. 5. a situation will be described wherein the parent device 1 actually retransmits the data packet A after the child device 2 does not receive an initial transmission of the data packet A. In FIG. 5, the various timings 0, t1, t2, t3, and t4 are the same as shown in FIG. 4, so their explanations will be omitted to avoid duplicating description.

In contrast to the situation shown in FIG. 4, in the situation show in FIG. 5 the parent device 1 does not receive the resent data packet B at the timing t4. That is, in the situation of FIG. 4, the parent device 1 did not retransmit the data packet A because it received the retransmission of the data packet B from the child device 2. However, in the situation represented in FIG. 5, the parent device 2 does not receive the data packet B for some reason, for example because the child device 2 did not initially transmit the data packet B at the timing t1, and so does not retransmit the data packet B at the timing t3. Also, it is conceivable that the data packets A and B collide and the child device 2 retransmits the data packet B at the timing t3 in the manner shown in FIG. 4, but that the parent device 1 is unable to pick up the retransmission of the data packet B because of wireless noise and the like.

In the situation shown in FIG. 5, the parent device 1 waits for the retry waiting time Tb1 to elapse and then retransmits the data packet A at timing t7. In this way, timing t7 equals the retry waiting time Tb1. Said differently, timing t7 equals the sum of the retry waiting time Tb2, twice the delay time Td (2×Td), and the time width Tp, or the sum of timing t3, the delay time Td and the time width Tp.

Because t7=t3+Tp+Td, the timing t7 avoids the time span wherein the child device 2 might be retransmitting the data packet B, even after worst conceivable timing t1 for collision of transmissions between the parent and child device 1, 2. As mentioned previously, the worst conceivable timing is when the child device 2 first transmits the data packet B at timing t1 after the delay time Td from when the parent device 1 transmitted the data packet A at timing 0. If the parent device 1 does not receive a transmission from the child device 2 by timing t7, it can assume that the child device 2 did not transit the data packet B at timing t1. When the parent device 1 retransmits at timing t7, retransmitted data packets can be prevented from colliding into each other.

The child device 2 starts reception of the retransmitted data packet A at a timing t8, which is when the delay time Td elapses after the timing t7. When the child device 2 properly completes reception of the data packet A, then the child device 2 transmits an acknowledge signal (not shown in FIG. 5) after a predetermined time duration elapses. The acknowledge signal notifies the parent device 1 that the child device 2 has received the data packet A.

According to the wireless transmission device and method of the present embodiment, the retry waiting time of the child device 2 is set shorter than the retry waiting time of the parent device 1, so that the child device 2 retransmits its data packet with priority over the parent device 1. Therefore, even when transmissions of data packets from the parent device 1 and the child device 2 collide with each other, so that neither the parent device 1 nor the child device 2 will send a response packet, retransmission of data will be stable because it can be predicted which device will transmit its data packet first. Further, the parent device 1 will retransmit its data packet even if for some reason the child device 2 does not retransmit its data packet. The child device 2 will properly receive the retransmitted data packet A so that transmission of the data packet A from the parent device 1 will not be unnecessarily performed.

Although the embodiment described the retry waiting time Tb1 as used by the parent device 1 and the retry waiting time Tb2 as used by the child devices 2, 3, the retry waiting time Tb2 can be used by the parent device 1 and the retry waiting time Tb1 can be used by the child devices 2, 3 as shown in FIGS. 6 and 7. With this configuration retransmitting operations of the parent device 1 are performed with priority over those of the child devices 2, 3. Normally, the child devices 2, 3 frequently send out dialing information, so there is a good reason to give priority to the child devices. However, when it is desired to reliably send information relating to line connection from the parent device 1 to the child devices 2, 3, then there is a need to set priority to the parent device 1. It should be noted that the timing charts of FIGS. 6 and 7 are substantially the same as those in FIGS. 4 and 5, except that the upper line is switched to represent the child device 2 and the lower line is switched to represent the parent device 1.

The embodiment described a situation when the retry waiting times are fixedly set for the parent device 1 and the child devices 2, 3. However, the retry waiting times can be variably set for the parent device 1 and the child devices 2, 3. For example, the parent device 1 and the child devices 2, 3 can be adapted for mutually transmitting and receiving data packets which include a priority command as transmission data. The priority command is for indicating which of the parent device 1 and the child devices 2, 3 is to have priority with respect to retransmitting data packets after a collision. With this configuration, retransmitting processes can be more freely performed. This is beneficial because priority of the parent device 1 and the child devices 2, 3 can be changed according to circumstances.

Figure 8:
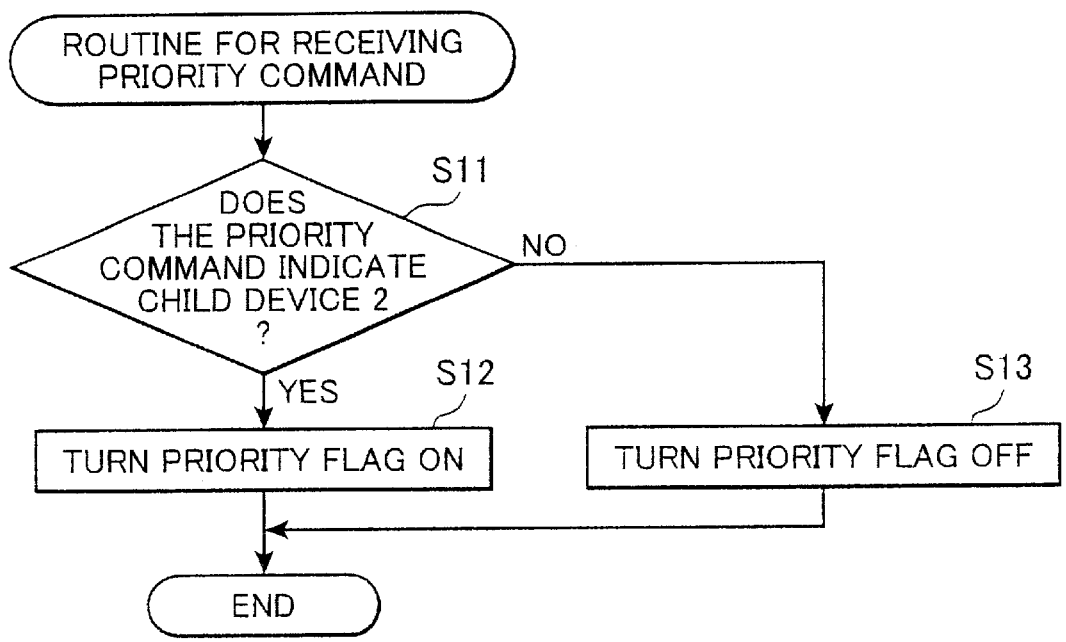
FIG. 8 is a flowchart representing a routine performed for receiving a priority command.
Figure 9:
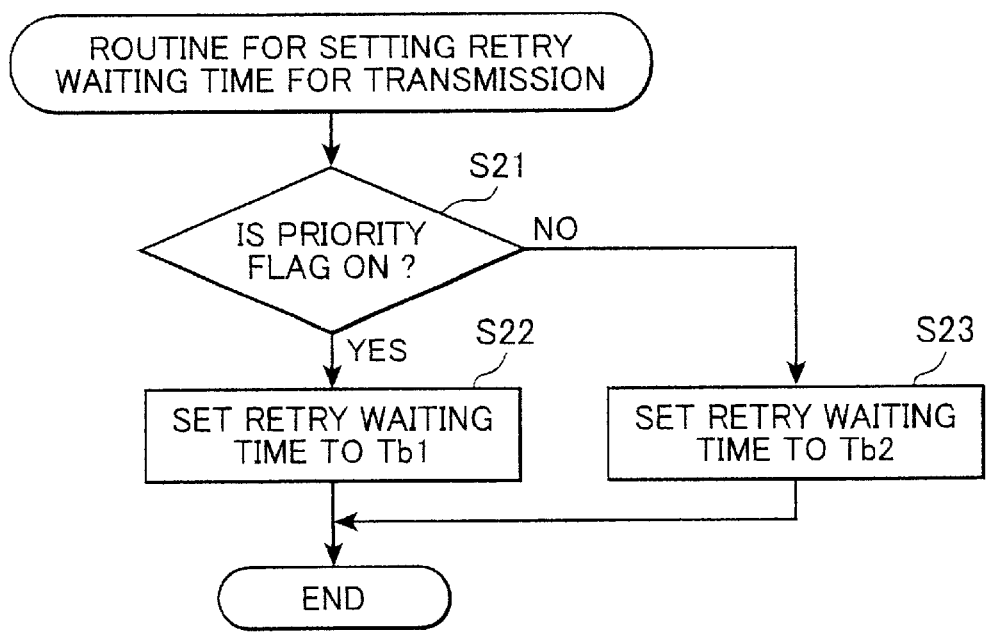
FIG. 9 is a flowchart representing a routine performed for setting a retry waiting time based on a priority flag, before transmitting a data packet.

Here, while referring to the flowcharts of FIGS. 8 and 9, an example will be provided for processes performed to flexibly set priority. Although all the devices 1, 2, and 3 are capable of performing the processes represented by the flowcharts of FIGS. 8 and 9, to facilitate explanation, the following explanation will be provided for the case when the child device 2 performs the processes.

It should be noted that the ROM of each the device 1, 2, and 3, store programs for performing these processes. The ROM of each device 1, 2, 3 also stores a table with both the retry waiting time Tb1, which is used when another device is set with priority, and the retry waiting time Tb2, which is used when the device itself is set with priority. The RAM of each device 1, 2, 3 includes a priority flag that when turned ON indicates that the device itself has priority, and when turned OFF indicates that another device has priority.

As shown in FIG. 8, when the parent device 1 sends, and the child device 2 receives, a data packet with a priority command, first in S11 the CPU 210 determines which of the devices is to be given priority, for example, by determining whether the transmission data in the data packet indicates the child device 2 itself or not. If priority is to be given to the child device 2 (S11:YES), then the CPU 210 turns the priority flag ON in S12. If priority is to be given to another device 1, 3 (S11:NO), then the CPU 210 turns the priority flag OFF in S13.

As shown in FIG. 9, when the child device 2 is to transmit a data packet, first in S21 the CPU 210 checks the setting of the priority flag in the RAM 212. If the priority flag is turned ON (S21:YES), then (S22:Retry waiting time set to Tb1) the CPU 210 retrieves the retry waiting time Tb1 from the ROM 211 and sets it as the retry waiting time of the child device 2. Then, after starting to send the data packet to another device, the CPU 210 waits for the other device to return a response packet. If the CPU 210 receives no response packet by the time the 20 retry waiting time Tb1 elapses, then the CPU 210 performs processes to resend the data packet.

On the other hand, if the priority flag is turned OFF (S21:NO), then (S23:Retry waiting time set to Tb2) the CPU 210 retrieves the retry waiting time Tb2 from the ROM 211 and sets it as the retry waiting time of the child device 2. Then, after starting to send the data packet to another device, the CPU 210 waits for the other device to return a response packet. If the CPU 210 receives no response packet by the time the retry waiting time Tb2 elapses, then the CPU 210 performs processes to resend the data packet.

It should be noted that the child device 3 performs the same processes as the child device 2 relating to retransmission of data packet. Further, unlimited numbers of child devices can be provided to the system.

The embodiment described the present invention applied to an analog cordless telephone system. However, this is not a limitation of the present invention. The present invention can be applied to any wireless transmission system wherein data transmission and reception between a parent device and one or more child devices are performed using half duplex transmission, and processes for retransmitting data are performed during certain circumstances. For example, the present invention can be applied to a wireless LAN system.

What is claimed is:

1. A wireless transmission system comprising:

a parent device and at least one child device that establish a wireless connection to exchange data packets using half duplex transmission, the parent device including:

a parent-side transmission unit that sends a data packet with a time width Tp to the at least one child device using wireless half-duplex transmission, the data packet reaching the at least one child device after a delay time Td from when the parent-side transmission unit transmitted the data packet;

a parent-side judgement unit that judges whether one of retry waiting times Tb1 and Tb2 has elapsed from when the parent-side transmission unit transmitted the data packet;

a parent-side reception unit that determines whether a response packet has been received from the at least one child unit in response to the data packet; and a parent-side control unit that controls the parent-side transmission unit to retransmit the data packet when the parent-side reception unit determines that no response has been received by the time the parent-side judgement unit judges that the one of retry waiting times Tb1 and Tb2 has elapsed; and the at least one child device including:

a child-side transmission unit that sends a data packet with the time width Tp to the parent device using wireless half-duplex transmission, the data packet reaching the parent device after the delay time Td from when the child-side transmission unit transmitted the data packet;

a child-side judgement unit that judges whether the other of the retry waiting times Tb1 and Tb2 has elapsed from when the child-side transmission unit transmitted the data packet;

a child-side reception unit that determines whether a response packet has been received from the parent unit in response to the data packet; and a child-side control unit that controls the child-side transmission unit to retransmit the data packet when the child-side reception unit determines that no response has been received by the time the child-side judgement unit judges that the other of retry waiting times Tb1 and Tb2 has elapsed;

wherein the retry waiting time Tb1 is greater than or equal to a sum of the retry waiting time Tb2, twice the delay time Td, and the time width Tp (Tb1≧Tb2+2Td+Tp).

2. A wireless transmission system as claimed in claim 1, wherein the parent-side judgement unit judges elapse of the retry waiting time Tb1 and the child-side judgement unit judges elapse of the retry waiting time Tb2.

3. A wireless transmission system as claimed in claim 1, wherein the parent-side judgement unit judges elapse of the retry waiting time Tb2 and the child-side judgement unit judges elapse of the retry waiting time Tb1.

4. A wireless transmission system as claimed in claim 1, wherein the parent-side reception device and the child-side reception device are adapted to receive a priority command indicating that one of the parent device and the at least one child device has priority for communication of data, the parent-side control device judging whether a priority command received by the parent-side reception device indicates the parent device or the child device, the child-side control device judging whether a priority command received by the child-side reception device indicates the parent device or the child device;

wherein when a priority command indicates the parent device has priority:

the parent-side control device controls the parent-side judgement unit to judge elapse of the retry waiting time Tb2; and the child-side control device controls the child-side judgement unit to judge elapse of the retry waiting time Tb1; and wherein when a priority command indicates the child device has priority:

the parent-side control device controls the parent-side judgement unit to judge elapse of the retry waiting time Tb1; and the child-side control device controls the child-side judgement unit to judge elapse of the retry waiting time Tb2.

5. A wireless transmission system as claimed in claim 1, wherein the wireless transmission system is a cordless telephone system connected to a telephone line.

6. A wireless transmission system comprising:

a parent device and at least one child device that establish a wireless connection to exchange data packets using half duplex transmission;

one of the parent device and the at least one child device sending a data packet, determining whether a retry waiting time Tb1 has elapsed from when the data packet is sent, and, if the one of the parent device and the at least one child device receives no response packet in response to the data packet by the time the retry waiting time Tb1 elapses, resending the data packet;

another of the parent device and the at least one child device sending a data packet, determining whether a retry waiting time Tb2 has elapsed from when the data packet is sent, and, if the another of the parent device and the at least one child device receives no response packet in response to the data packet by the time the retry waiting time Tb2 elapses, resending the data packet;

wherein the retry waiting time Tb1 is greater than or equal to a sum of the retry waiting time Tb2, two times a delay time Td from when the data packet is sent until the data packet is assumed to have arrived at its destination, and a time width Tp of the data packet (Tb1≧Tb2+2Td+Tp).

7. A wireless transmission system as claimed in claim 6, wherein the parent device and the at least one child device are adapted to receive a priority command indicating that one of the parent device and the at least one child device has priority for communication of data, the parent device judging whether a priority command received by the parent device indicates the parent device or the child device, the child device judging whether a priority command received by the child-side reception device indicates the parent device or the child device;

wherein when a priority command indicates the parent device has priority:
the parent device determines whether a retry waiting time Tb2 has elapsed from when the data packet is sent; and
the child device determines whether a retry waiting time Tb1 has elapsed from when the data packet is sent; and wherein when a priority command indicates the child device has priority:
the parent device determines whether a retry waiting time Tb1 has elapsed from when the data packet is sent; and
the child device determines whether a retry waiting time Tb2 has elapsed from when the data packet is sent.

8. A wireless transmission system comprising:
a parent device and at least one child device that establish a wireless connection to exchange data packets using half duplex transmission, the parent device and the at least one child device resending a data packet for which no response packet was received, one of the parent device and the at least one child device waiting a retry waiting time Tb1 from transmission of the data packet before resending a data packet, another of the parent device and the at least one child device waiting a retry waiting time Tb2 from transition of the data packet before resending a data packet, wherein the retry waiting time Tb1 is set to satisfy the following relationship with the retry waiting time Tb2, a propagation delay Td from when a data packet is sent until the data packet is supposed to reach its intended destination, and a time width Tp of the data packet:

$$Tb1 \geq Tb2+2Td+Tp.$$

9. A wireless transmission system as claimed in claim 8, wherein the parent device utilizes the retry waiting time Tb1 and the at least one child device utilizes the retry waiting time Tb2.

10. A wireless transmission system as claimed in claim 8, wherein the parent device utilizes the retry waiting time Tb2 and the at least one child device utilizes the retry waiting time Tb1.

11. A wireless transmission system as claimed in claim 8, wherein the parent device and the at least one child device are adapted to receive a priority command indicating that one of the parent device and the child device has priority for exchange of data packets, the parent device utilizing the retry waiting time Tb2 and the at least one child device utilizing the retry waiting time Tb1 when the priority command indicates the parent device has priority, the parent device utilizing the retry waiting time Tb1 and the at least one child device utilizing the retry waiting time Tb2 when the priority command indicates the at least one child device has priority.

12. A wireless transmission system as claimed in claim 8, wherein the wireless transmission system is a cordless telephone system connected to a telephone line.

13. A wireless transmission system as claimed in claim 8, wherein the parent device and the at least one child device are adapted to receive a priority command indicating that one of the parent device and the at least one child device has priority for communication of data, the parent device detecting whether a priority command received by the parent-side reception device indicates the parent device or the child device, the child device detecting whether a priority command received by the child-side reception device indicates the parent device or the child device;

wherein when a priority command indicates the parent device has priority:
the parent device waits a retry waiting time Tb2 from transmission of the data packet before resending a data packet; and
the child-side control device waits a retry waiting time Tb1 from transmission of the data packet before resending a data packet; and wherein when a priority command indicates the child device has priority:
the parent device waits a retry waiting time Tb1 from transmission of the data packet before resending a data packet; and
the child-side control device waits a retry waiting time Tb2 from transmission of the data packet before resending a data packet.

14. A method of wireless transmission which comprises:
establishing a wireless connection between a parent device and at least one child device;
exchanging data packets between the parent device and the at least one child device using half duplex transmission;
judging whether one of a retry waiting time Tb1 and a retry waiting time Tb2 has elapsed from when the parent device transmits a data packet;
resending the data packet from the parent device when no response packet is received from the at least one child device by the time it is judged that the one of the retry waiting time Tb1 and the retry waiting time Tb2 has elapsed;
judging whether the other of the retry waiting time Tb1 and the retry waiting time Tb2 has elapsed from when the child device transmits a data packet; and
resending the data packet from the child device when no response packet is received from the parent device by the time it is judged that the other of the retry waiting time Tb1 and the retry waiting time Tb2 has elapsed;
wherein the retry waiting time Tb1 is set to satisfy the following relationship with the retry waiting time Tb2, a propagation delay Td from when a data packet is sent until the data packet is supposed to reached its intended destination, and a time width Tp of the data packet:

$$Tb1 \geq Tb2+2Td+Tp.$$

15. A method of wireless transmission as claimed in claim 14, wherein the retry waiting time Tb1 is used in the judgement for the parent device and the retry waiting time Tb2 is used in the judgement for the at least one child device.

16. A method of wireless transmission as claimed in claim 14, wherein the retry waiting time Tb2 is used in the judgement for the parent device and the retry waiting time Tb1 is used in the judgement for the at least one child device.

17. A wireless transmission system as claimed in claim 14, further comprising:
transmitting a priority command to the parent device and the at least one child device, the priority command indicating that one of the parent device and the child device has priority for exchange of data packets;

using the retry waiting time Tb2 for the parent device and the retry waiting time Tb1 for the at least one child device when the priority command indicates the parent device has priority; and using the retry waiting time Tb1 for the parent device and the retry waiting time Tb2 for the at least one child device when the priority command indicates the child device has priority.

18. A method of wireless transmission as claimed in claim 14, further comprising the steps of:

receiving a priority command indicating that one of the parent device and the child device has priority for communication of data;

determining whether the priority command indicates the parent-device or the child device;

wherein when a priority command indicates the parent device has priority:

the parent device judges whether the retry waiting time Tb2 has elapsed form when the parent device transmitted a data packet; and the child device judges whether the retry waiting time Tb1 has elapsed from when the child device transmitted a data packet; and wherein when a priority command indicates the child device has priority:

the parent device judges whether the retry waiting time Tb1 has elapsed form when the parent device transmitted a data packet; and the child device judges whether the retry waiting time Tb2 has elapsed from when the child device transmitted a data packet.

* * * * *